US008612416B2

(12) United States Patent
Kumar et al.

(10) Patent No.: US 8,612,416 B2
(45) Date of Patent: *Dec. 17, 2013

(54) DOMAIN-AWARE SNIPPETS FOR SEARCH RESULTS

(75) Inventors: Girish Kumar, Redmond, WA (US); Fang Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,024

(22) Filed: May 1, 2012

(65) Prior Publication Data

US 2012/0215755 A1    Aug. 23, 2012

Related U.S. Application Data

(63) Continuation of application No. 11/863,911, filed on Sep. 28, 2007, now Pat. No. 8,195,634.

(51) Int. Cl.
*G06F 17/30* (2006.01)

(52) U.S. Cl.
USPC ............................ 707/706; 707/711; 707/728

(58) Field of Classification Search
USPC ........................................................ 707/706
See application file for complete search history.

(56) References Cited

U.S. PATENT DOCUMENTS

| | | | | |
|---|---|---|---|---|
| 6,745,185 | B2* | 6/2004 | Lee et al. | 1/1 |
| 6,763,496 | B1* | 7/2004 | Hennings et al. | 715/205 |
| 7,073,122 | B1* | 7/2006 | Sedghi | 715/234 |
| 7,136,875 | B2* | 11/2006 | Anderson et al. | 1/1 |
| 7,401,072 | B2* | 7/2008 | Piscitello et al. | 1/1 |
| 7,624,101 | B2* | 11/2009 | Lin et al. | 1/1 |
| 7,631,294 | B2* | 12/2009 | Rush et al. | 717/111 |
| 2005/0262056 | A1* | 11/2005 | Hamzy et al. | 707/3 |
| 2006/0004809 | A1* | 1/2006 | Zhang et al. | 707/101 |
| 2007/0073758 | A1* | 3/2007 | Perry et al. | 707/102 |

* cited by examiner

*Primary Examiner* — Robert Beausoliel, Jr.
*Assistant Examiner* — Noosha Arjomandi
(74) *Attorney, Agent, or Firm* — Shook Hardy & Bacon LLP

(57) ABSTRACT

Techniques are disclosed for providing a domain-aware snippet for a search result. A uniform resource locator (URL) is identified for a search result obtained in response to a search query, and it is determined that the URL corresponds to a single domain that has a plurality of web pages that are generated using a template that is common to each of the web pages in the domain. The template comprises a hypertext markup language (HTML) layout pattern that includes multiple sections shared by the web pages. A ranking value is assigned to the multiple sections and is used to identify a first section of the template that is relevant to the search query. A snippet is provided to a user for the search result; the snippet includes at least a portion of text from the first section.

10 Claims, 6 Drawing Sheets

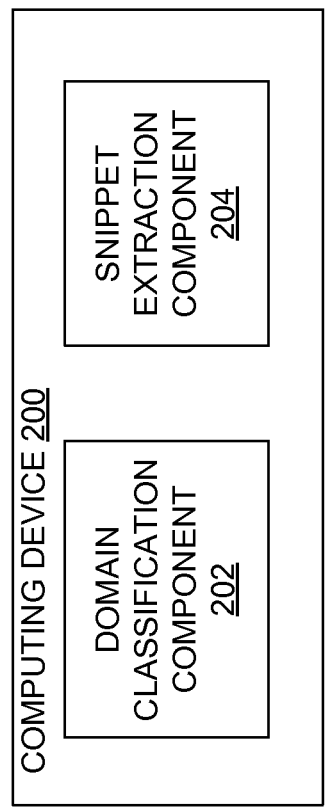

304 ⌈ </span><span id="vidDescRemain">the Kazakhstan's most famous journalist talks about his
hobbies, his former wife, and dances with Beck ><span id="vidDescMore" class="smallText"> ← 302
⌊_____306_____⌋

<div id="playerDiv"><div style="padding: 20px; font-size:14px; font-weight: bold;">Hello, you
either have JavaScript turned off or an old version of Macromedia's Flash Player. <a href="http:// ← 308
www.macromedia.com/go/getflashplayer/" onclick="_hbLink('Get+Flash','Watch');">Get the latest
flash player</a></div>

DOMAIN-AWARE SNIPPETS FOR SEARCH RESULTS

CROSS-REFERENCE TO RELATED APPLICATIONS

This application is a Continuation of copending U.S. Non-provisional Application having Ser. No. 11/863,911, filed on Sep. 28, 2007, entitled "Domain-Aware Snippets for Search Results." The entirety of the aforementioned application is incorporated by reference herein.

BACKGROUND

Today, search engines usually display snippets along with search results retrieved for a search query. A snippet typically comprises a short excerpt of text from a web page of the search result and is displayed with a link to the web page. The snippet may also contain text from the web page that matches keywords found within the search query. The snippet helps the user decide if the search result potentially includes content the user is interested in viewing before the user has to actually select the search result. By providing the user with a short excerpt of the subject matter that is found on a web page of the search result, the user can efficiently filter through several search results in a shorter amount of time.

Usually, snippets are extracted from the content of a web page using a conventional "one-size-fits-all" algorithm. This conventional algorithm typically employs a set of heuristics (position of words on a web page, the number of words in a particular area of a web page, the keywords of a search query found on a webpage, etc.) that is used to extract snippets from all types of web pages. However, the set of heuristics occasionally does not possess sufficient aptitude to determine the most important text from a web page that should be provided within a snippet. Accordingly, the set of heuristics may sometimes cause the conventional algorithm to extract irrelevant text from the web page for usage in a snippet.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are disclosed for providing a domain-aware snippet for a search result. Such techniques include identifying templates used to create a plurality of web pages of a domain. The templates are identified by determining if a predetermined number of web pages within the domain share a predetermined number of sections. A section of the web page may be identified by its tag pattern. Once a template has been identified, the template, the content of the web pages related to the template, and a Uniform Resource Locator pattern of the web page are stored in a database for future searching purposes.

BRIEF DESCRIPTION OF THE DRAWINGS

Illustrative embodiments of the present invention are described in detail below with reference to the attached drawing figures, which are incorporated by reference herein and wherein:

FIG. 2 is a block diagram of an exemplary computing device for implementing an embodiment of the invention;

FIG. 3 illustrates exemplary tag patterns within a web page's source code that identify different sections of the web page according to an embodiment of the invention;

DETAILED DESCRIPTION

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
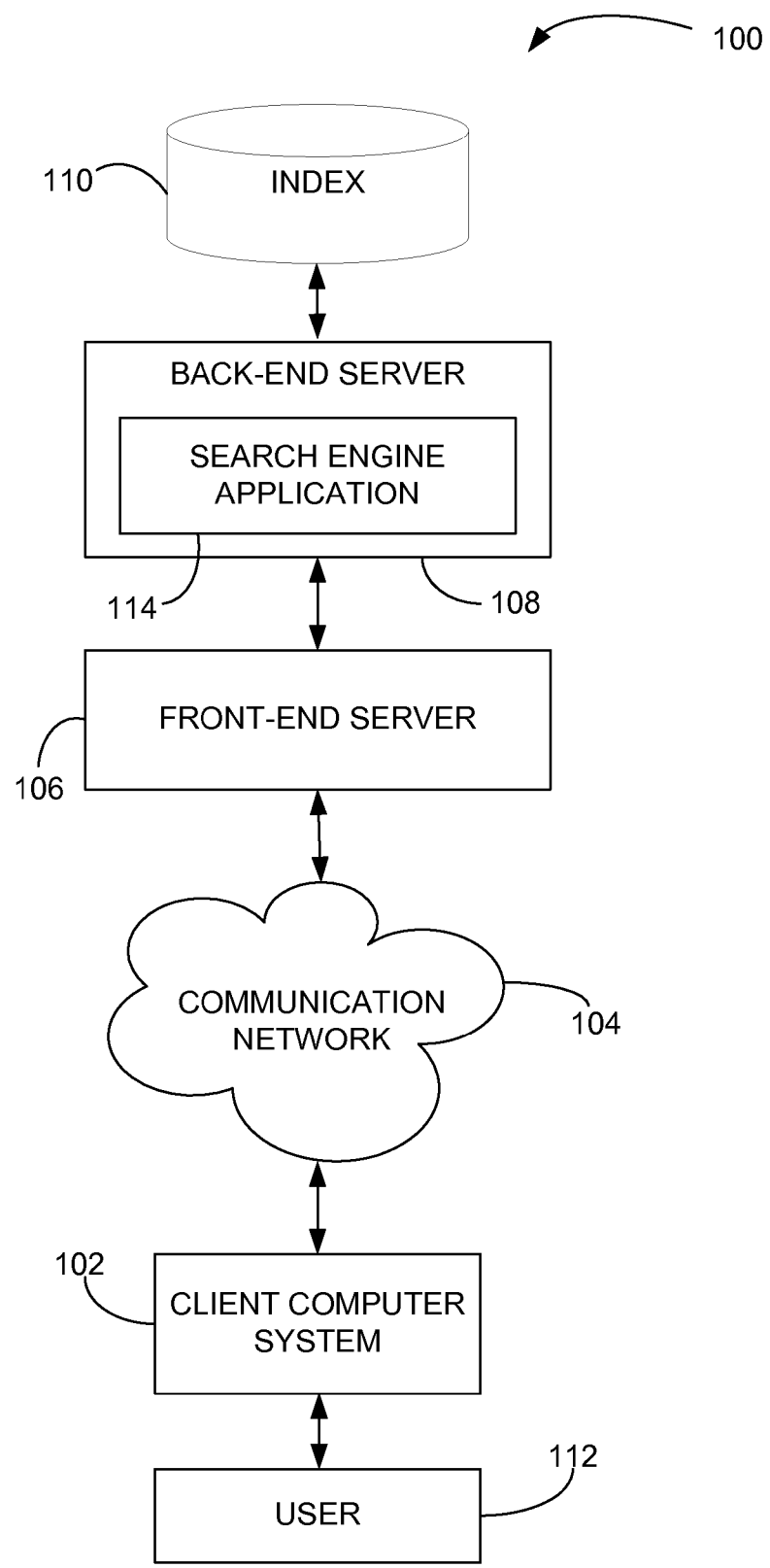
FIG. 1 is a block diagram of an exemplary network environment for implementing an embodiment of the invention.

Referring initially to FIG. 1, an exemplary network environment for implementing an embodiment of the invention is shown and designated generally as network environment 100. Network environment 100 is but one example of a suitable environment and is not intended to suggest any limitation as to the scope of use or functionality of the invention. Neither should the network environment 100 be interpreted as having any dependency or requirement relating to any one or combination of elements illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, servers, etc. The invention may also be practiced in distributed computing environments where tasks are performed by remote-processing devices that are linked through a communications network.

Network environment 100 includes a client 102 coupled to a network 104 via a communication interface. The communication interface may be an interface that can allow the client to be directly connected to any other device or allows the client 102 to be connected to a device over network 104. Network 104 can include, for example, a local area network (LAN), a wide area network (WAN), or the Internet (or the World Wide Web). In an embodiment, the client 102 can be connected to another device via a wireless interface through the network 104.

One or more servers communicate with the client 102 via the network 104 using a protocol such as Hypertext Transfer Protocol (HTTP), a protocol commonly used on the Internet to exchange information. In the illustrated embodiment, a front-end server 106 and a back-end server 108 (e.g., web server or network server) are coupled to the network 104. The client 102 employs the network 104, the front-end server 106 and the back-end server 108 to access Web page data stored, for example, in a central data index (index) 110.

Embodiments of the invention provide searching for relevant data by permitting search results to be displayed to a user 112 in response to a user-specified search request (e.g., a search query). In one embodiment, the user 112 uses the client 102 to input a search request including one or more terms concerning a particular topic of interest for which the user 112 would like to identify relevant electronic documents (e.g., Web pages). For example, the front-end server 106 may be responsive to the client 102 for authenticating the user 112 and redirecting the request from the user 112 to the back-end server 108.

The back-end server 108 may process a submitted query using the index 110. In this manner, the back-end server 108 may retrieve data for electronic documents (i.e., search results) that may be relevant to the user. The index 110 contains information regarding electronic documents such as Web pages available via the Internet. Further, the index 110 may include a variety of other data associated with the electronic documents such as location (e.g., links, or Uniform Resource Locators (URLs)), metatags, text, and document category. In the example of FIG. 1, the network is described in the context of dispersing search results and displaying the dispersed search results to the user 112 via the client 102. Notably, although the front-end server 106 and the back-end server 108 are described as different components, it is to be understood that a single server could perform the functions of both.

A search engine application 114 is executed by the back-end server 108 to identify web pages and the like (i.e., electronic documents) in response to the search request received from the client 102. More specifically, the application 114 identifies relevant documents from the index 110 that correspond to the one or more terms included in the search request and selects the most relevant web pages to be displayed to the user 112 via the client 102.

FIG. 2 is a block diagram of an exemplary computing device 200 for implementing an embodiment of the invention. Computing device 200 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™ OS/2™ BeOS™, Mach™, Apache™, OpenStep™ or other operating system or platform. In an embodiment, computing device 200 may comprise one or more servers. In an embodiment, computing device 200 may be a search engine that includes front-end server 106, back-end server 108, search engine application 114, and index 110 (FIG. 1).

Computing device 200 may also be a client-side computing device. Computing device 200 may be or can include a desktop computer, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions. Computing device 200 may additionally be any portable media device such as digital still camera devices, digital video cameras (with or without still image capture functionality), media players such as personal music players and personal video players, and any other portable media device.

Computing device 200 can include a communication interface. The communication interface may be an interface that can allow the computing device 200 to be directly connected to any other device or allows the computing device 200 to be connected to a device over network 104. In an embodiment, the computing device 200 can be connected to another device via a wireless interface through the network 104.

Computing device 200 includes a domain classification component (DCC) 202 and a snippet extraction component (SEC) 204. In an embodiment, DCC 202 and SEC 204 are integrated into one component. The DCC 202 is a computer hardware or software component with logic configured to identify a template that is used to create multiple web pages of a domain. In an embodiment, the template is a structured layout that many web pages of a particular domain share. The structured layout may contain multiple sections shared by each corresponding web page. For example, a particular website may be dedicated to providing relevant information regarding a plurality of movies. The website may provide a user interface (UI) that allows a user to select a particular movie of interest from the plurality of movies. The website can further provide a movie information page that displays relevant information of the selected movie. The movie information page can be constructed from a template that has multiple sections shared by each movie's information page. For example, each movie information page may contain a movie title section, a release date section, a cast section, a director section, a plot section, a reviews section, etc. Accordingly, each movie information page can have the same template, but the content of each section of the template may differ for each movie.

A template may comprise a Hypertext Markup Language (HTML) layout pattern that includes the multiple sections shared by the plurality of web pages of the same domain. The HTML layout pattern of the template may be located within the source code of each web page. Each section of the template may designated by a HTML tag pattern within the HTML layout pattern. In an embodiment, the DCC 202 is configured to scan the source code of multiple web pages of a domain to identify a template comprising a predetermined number of sections that are common to a predetermined number of web pages. For example, the DCC 202 may be configured to determine that a template exists if at least twenty web pages of the domain have at least ten sections in common with each other. The DCC 202 can identify the different sections of a web page by identifying different tag patterns within the source code of the web page. FIG. 3 illustrates exemplary tag patterns within a web page's source code that identify different sections 300 of the web page according to an embodiment of the invention. Section 302 is identified through a first type of tag pattern. The first type of tag pattern is one that has a beginning sequence of tags and an ending sequence of tags. Section 302 has a tag pattern with a beginning sequence of tags 304 and an ending sequence of tags 306. However, the text between the beginning sequence of tags 304 and the ending sequence of tags 306 is not considered part of the tag pattern.

Section 308 is identified through a second type of tag pattern. Section 308 is an example of an exact match tag pattern. An exact match pattern comprises one sequence of HTML tags and HTML text. With an exact match pattern, the entire section, including the text, is considered the tag pattern. For example, the entire section 308 is the tag pattern. The DCC 202 can be configured to identify multiple variations of these two types of tag patterns when mining through each web page's source code. In an embodiment, the tag patterns are manually identified by a user.

Once a template for a domain has been identified, the DCC 202 can associate a URL pattern of the corresponding web pages with the template and the content of the web page related to the template. The URL pattern, template, and the related content of the web page can be associated together within a database accessible to the DCC 202. In an embodiment, the related content of the web page includes the text within the source code of each section of the template. In an embodiment, a URL pattern is a portion of each web page's URL that is shared among all web pages associated with the template. For example, a first web page generated with a template may have the URL of www.website1.com/movies/informationpage/movie1, a second web page generated by the same template may have the URL of www.website1.com/movies/informationpage/movie2, and a third web page generated by the same template may have the URL of www.website1.com/movies/informationpage/movie3. Each of the above URLs share the portion "www.website1.com/movies/informationpage" and such portion may be considered the URL pattern. Accordingly, the URL pattern of "www.website1.com/movies/informationpage" can be associated with the corresponding template and the related content of the web page in a database. In an embodiment, there may not be a common URL pattern shared by each of the web pages associated with the template. In such an embodiment, the actual URLs of each web page are the URL patterns and are associated with the template and the related web page content. In an embodiment, a template, the related content of the web page, and a URL pattern may be identified and associated with each other before a search query is received from a user. In another embodiment, the template, the related content of the web page, and a URL pattern may be identified and associated with each other on-the-fly when a search query is received from a user.

The DCC 202 can also be configured to rank the sections of a template based on the importance of each section. The DCC 202 may assign a ranking value to each section that identifies the importance of the section. The ranking value may be a number, text word or phrase, character, symbol, or any other identifier that may be used to convey the importance of the section. Typically, the most important sections will receive the higher ranking values. In an embodiment, the DCC 202 can determine the importance of a section based on keywords found within the text of the section. In such an embodiment, certain keywords (words or phrases) may be weighted more heavily than others such that their presence may denote the importance of the section. In another embodiment, the DCC 202 can determine the importance of a section based on the type of tag pattern that is associated with the section. For example, sections with exact match tag patterns may be deemed less important than sections that have tag patterns with a starting and ending sequence of tags. Accordingly, sections with exact match tag patterns may be assigned a lower ranking value. In yet another embodiment, the importance of a section is determined manually by a user. The ranking value may be associated with each section within the same database that stores the template, the related content of the web page, and the URL pattern. In an embodiment, the ranking value is assigned to a section before a search query is received from a user. In another embodiment, the ranking value is assigned to a section on-the-fly when a search query is received from a user.

Once the database of associated templates, related content of web pages, and URL patterns has been created, the DCC 202 may also be configured to respond to a search query by helping to provide a snippet of text from a section that is relevant to the search query. The DCC 202 can be configured to receive a search result in response to a search query, identify the URL of the search result, and determine if the URL is associated with a URL pattern of a domain that uses a template to create multiple web pages of the domain. If the search result is not associated with such a URL pattern, the snippet for the search result can be obtained using a conventional "one-size-fits-all" algorithm. If the search result is associated with such a URL pattern, the DCC 202 can inform the SEC 204 to further process the search result.

The SEC 204 is a computer hardware or software component with logic configured to extract text from a section of the related content of a web page in response to the processing of a search query. The text is extracted for use as a snippet of a search result corresponding to the search query. In an embodiment, the SEC 204 determines which section to extract text from based on a ranking value of the sections of the template and the relevance of the text of each section to the search query. For example, the SEC 204 may first examine the ranking values of each section to determine which sections of the template are most important. The SEC 204 may then compute a relevance value by comparing the keywords of the search query to the text of the different sections to see which sections are most relevant to the search query. In an embodiment, the relevance value may be based on whether the keywords of the search query match any portions of the text of a section. The SEC 204 can be configured to select a desirable section that has the highest ranking value and relevance value with respect to the search query. Once the desirable section is selected, the SEC 204 can extract a portion of the text or all of the text of the desirable section to be incorporated into a snippet for the search result.

Figure 6:
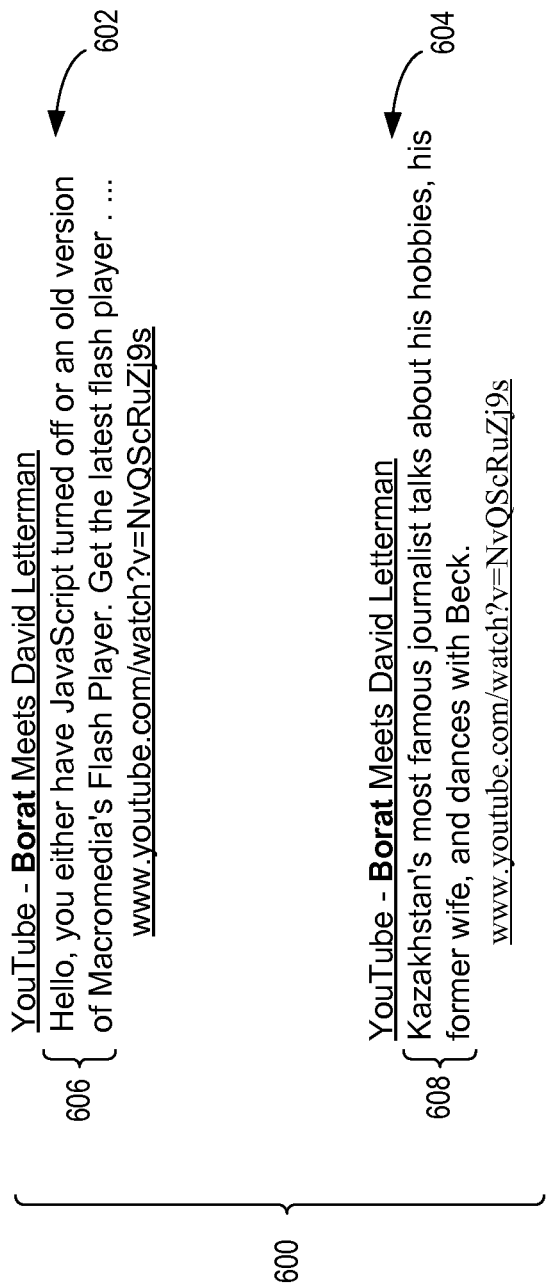
FIG. 6 is an illustration of two different versions of the same search result, wherein a first search result is obtained using a conventional "one-size-fits-all" algorithm and a second search result is obtained, according to an embodiment of the invention, using a domain classification component and a snippet extraction component.

FIG. 6 is an illustration of two different versions of the same search result 600, wherein a first search result 602 is obtained using a conventional "one-size-fits-all" algorithm and a second search result 604 is obtained, according to an embodiment of the invention, using a DCC 202 and SEC 204 (FIG. 2). As shown, the "one-size-fits-all" algorithm has the potential to extract irrelevant text for use as a snippet 606 for a search result of the search query "youtube.com borat." The text may have come from, for example, section 308 of FIG. 3. However, the DCC 202 can be used to rank the text of section 302 (FIG. 3) higher than the text of section 308 such that the relevant text of section 308 can be used as a snippet 608 for future uses of the same search result.

Figure 4:
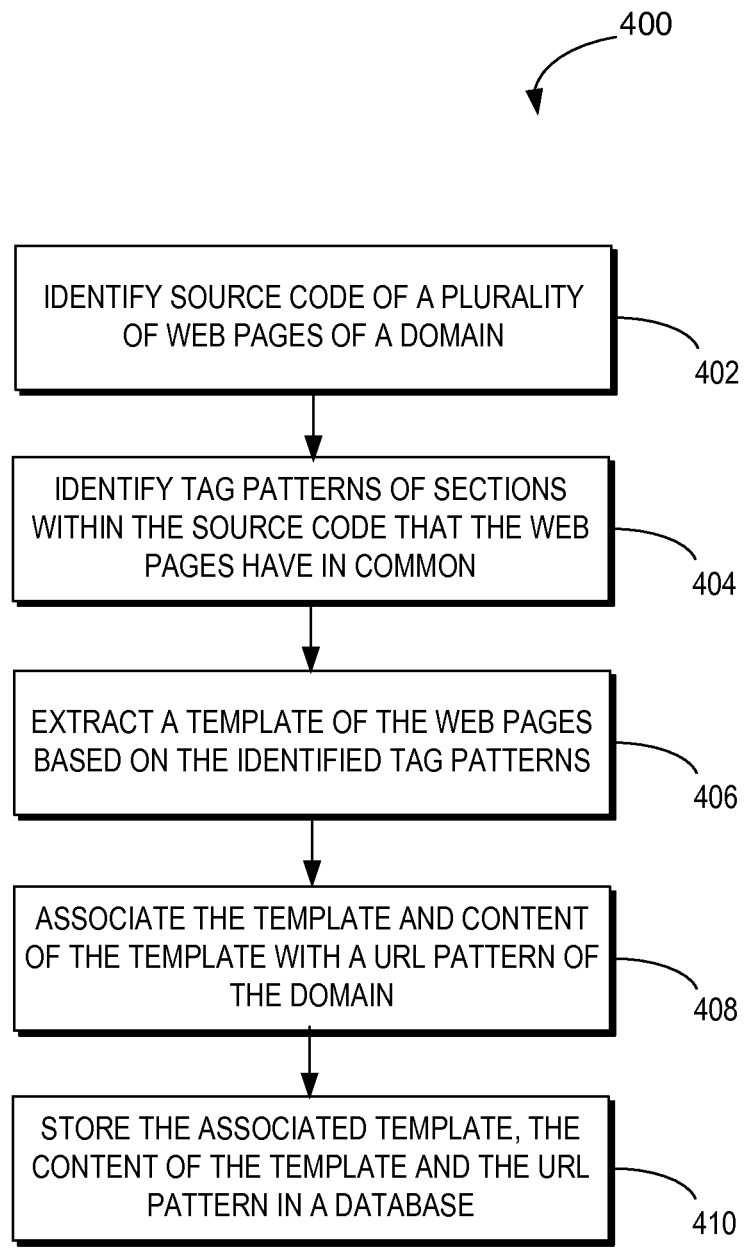
FIG. 4 is a flow diagram of an exemplary method of providing a domain-aware snippet for a search result according to an embodiment of the invention.

FIG. 4 is a flow diagram of an exemplary method 400 of providing a domain-aware snippet for a search result according to an embodiment of the invention. At operation 402, source code for a plurality of web pages of a domain is identified. At operation 404, tag patterns of sections within the source code of the plurality of web pages are identified. In an embodiment, the plurality of web pages have the same tag patterns. At operation 406, a template of the plurality of web pages is extracted based on the identified tag patterns. At operation 408, the template and content of the web page related to the template are associated with a URL pattern of the domain. At operation 410, the association of the template, the related content of the web page, and the URL pattern are stored in a database. In an embodiment, a DCC such as DCC 202 (FIG. 2) may perform operations 402, 404, 406, 408, and 410.

Figure 5:
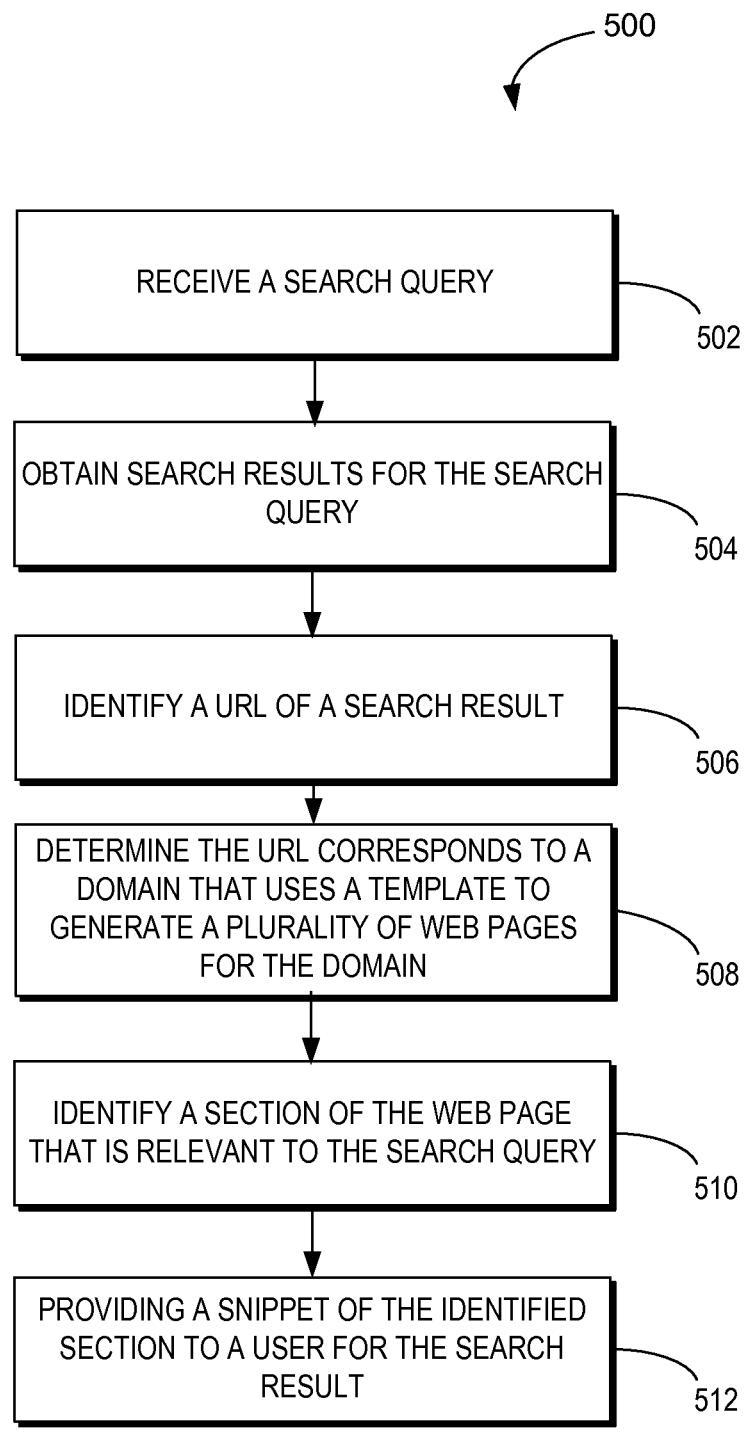
FIG. 5 is a flow diagram of another exemplary method of providing a domain-aware snippet for a search result according to an embodiment of the invention.

FIG. 5 is a flow diagram of another exemplary method 500 of providing a domain-aware snippet for a search result according to an embodiment of the invention. At operation 502, a search query is received. At operation 504, search results for the search query are obtained. At operation 506, a URL for a search result is identified. At operation 508, a determination is made that the URL corresponds to a domain that uses a template to generate a plurality of web pages for the domain. In an embodiment, the determination may be based on whether the URL corresponds to a particular URL pattern of the domain. At operation 510, a section of a web page, from the plurality of web pages, that is relevant to the search query is identified. In an embodiment, the relevance of the section to the search query may be based on a ranking value of the section and/or a relevance value related to the text of the section. At operation 512, a snippet of the identified section is provided to a user for the search result. In an embodiment, the snippet includes at least a portion of text from the identified section.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. One or more computer-storage memory components having computer-usable instructions stored thereon for performing a method of providing a domain-aware snippet for a search result, the method comprising:

identifying source code for a plurality of web pages that belong to a single domain:

identifying one or more tag patterns of a predetermined number of sections within the source code of the plurality of web pages belonging to the single domain, wherein a predetermined number of web pages of the plurality of web pages belonging to the single domain share at least one identical tag pattern;

based on the identifying of the one or more tag patterns of the predetermined number of sections within the source code of the plurality of web pages belonging to the single domain, determining that a template exists;

extracting the template of the predetermined number of web pages of the plurality of web pages belonging to the single domain, wherein the template is a structured layout used to construct each of the plurality of web pages belonging to the single domain, and wherein the template is shared by each of the predetermined number of web pages of the plurality of web pages belonging to the single domain;

associating the template and content of the predetermined number of web pages of the plurality of web pages related to the template with a Uniform Resource Locator (URL) pattern of the single domain, the URL pattern comprising a portion of a URL that is shared among all of the predetermined number of web pages of the plurality of web pages associated with the template;

storing the association of the template, the related content, and the URL pattern in a database;

receiving a search query;

obtaining one or more search results for the search query;

identifying a Uniform Resource Locator (URL) for at least one of the one or more search results;

accessing the database and determining that the URL for the at least one of the one or more search results corresponds to the URL pattern in the database;

determining that the related content associated with URL pattern and the template in the database is relevant to the search query; and providing a snippet to a user for the at least one search result, the snippet comprising a portion of the related content in the database.

2. The one or more computer-storage memory component according to claim 1, wherein the template is used to generate the HTML layout pattern for the each of the plurality of web pages.

3. The one or more computer-storage memory components of claim 1, wherein the relevance of the related content to the search query is based in part on a ranking value associated with a section of the predetermined number of sections from which the related content was derived, the ranking value indicating an importance of the section.

4. A system for providing a domain-aware snippet for a search result, the system comprising:

a computing device associated with a search engine having one or more processors and one or more computer-readable storage media;

a domain classification component configured to:

identify and extract a template used to generate a plurality of web pages of a single domain, wherein the template is a structured layout used to construct each of the plurality of web pages belonging to the single domain, and wherein the template is shared be each of the plurality of web pages belonging to the single domain, associate the template and content of the plurality of web pages related to the template with a Uniform Resource Locator (URL) pattern of the plurality of web pages, the URL pattern being a portion of a URL that is shared among all of the plurality of web pages associated with the template, and store the associated template, the related content, and the URL pattern in a database;

a search engine component configured to:

receive a search query;

obtain one or more search results for the search query;

identify a URL for at least one of the one or more search results;

access the database to determine that the URL for the at least one of the one or more search results corresponds to the URL pattern in the database;

determine that the related content associated with the URL pattern and the template in the database is relevant to the search query; and a snippet extraction component configured to:

extract a portion of text from the related content associated with the URL pattern and the template in the database, wherein the portion of the text is extracted based on a ranking value of a section of the template from which the text was extracted and a relevance value of the extracted portion of the text to the search query;

provides the portion of the text to a user in association with the at least one of the one or more search results.

5. The system according to claim 4, wherein the template is used to generate the same HTML layout pattern for each of the plurality of web pages.

6. The system according to claim 4, wherein the template comprises a tag pattern for each of one or more sections shared by each of the plurality of web pages.

7. A computerized method carried out be a search engine running on one or more processors for providing a domain-aware snippet for a search result, the method comprising:

identifying source code for a plurality of web pages that belong to a single domain:

identifying one or more tag patterns of a predetermined number of sections within the source code of the plurality of web pages belonging to the single domain, wherein a predetermined number of web pages of the plurality of web pages belonging to the single domain share at least one identical tag pattern;

based on the identifying of the one or more tag patterns of the predetermined number of sections within the source code of the plurality of web pages belonging to the single domain, determining that a template exists;

extracting the template of the predetermined number of web pages of the plurality of web pages belonging to the single domain, wherein the template is a structured layout used to construct each of the plurality of web pages belonging to the single domain, and wherein the template is shared by each of the predetermined number of web pages of the plurality of web pages belonging to the single domain;

associating the template and content of the predetermined number of web pages of the plurality of web pages related to the template with a Uniform Resource Locator (URL) pattern of the single domain, the URL pattern comprising a portion of a URL that is shared among all of the predetermined number of web pages of the plurality of web pages associated with the template;

storing the association of the template, the related content, and the URL pattern in a database;

receiving a search query;

obtaining one or more search results for the search query;

identifying a Uniform Resource Locator (URL) for at least one of the one or more search results;

accessing the database and determining that the URL for the at least one of the one or more search results corresponds to the URL pattern in the database;

determining that the related content associated with the URL pattern and the template in the database is relevant to the search query; and providing a snippet to a user for the at least one search result, the snippet comprising a portion of text from the related content in the database.

8. The method according to claim 7, wherein the template is used to generate the HTML layout pattern for each of the plurality of web pages.

9. The method according to claim 7, wherein the template comprises a tag pattern for each of one or more sections shared by each of the plurality of web pages.

10. The method of claim 7, wherein the relevance of the related content to the search query is based in part on a ranking value associated with a section of the predetermined number of sections from which the related content was derived, the ranking value indicating an importance of the section.

* * * * *